(12) United States Patent
Gen

(10) Patent No.: US 6,613,129 B2
(45) Date of Patent: Sep. 2, 2003

(54) CYCLONE AND DUST FILTER VACUUM CLEANER

(75) Inventor: Ni Zu Gen, SoZhim (CN)

(73) Assignee: Euro-Pro Corporation (CA)

( * ) Notice: Subject to any disclaimer, the term of this patent is extended or adjusted under 35 U.S.C. 154(b) by 0 days.

(21) Appl. No.: 09/887,525

(22) Filed: Jun. 22, 2001

(65) Prior Publication Data

US 2002/0194993 A1 Dec. 26, 2002

(51) Int. Cl.[7] .......................... B01D 45/12; B01D 50/00
(52) U.S. Cl. .............................. 95/269; 55/318; 55/345; 55/426; 55/459.1; 55/457; 55/DIG. 3
(58) Field of Search .......................... 55/318, 345, 424, 55/426, 457, 459.1, DIG. 3; 15/353; 95/269

(56) References Cited

U.S. PATENT DOCUMENTS

| | | | |
|---|---|---|---|
| 2,230,453 A | * 2/1941 | Fitch .......................... 261/79.2 |
| 3,320,727 A | * 5/1967 | Farley et al. .............. 15/327.1 |
| 4,373,228 A | 2/1983 | Dyson |
| 4,593,429 A | 6/1986 | Dyson |
| 4,643,748 A | 2/1987 | Dyson |
| 4,826,515 A | 5/1989 | Dyson |
| 4,853,008 A | 8/1989 | Dyson |
| 4,853,011 A | 8/1989 | Dyson |
| D305,269 S | 12/1989 | Dyson |
| 5,062,870 A | 11/1991 | Dyson |
| 5,078,761 A | 1/1992 | Dyson |
| 5,090,976 A | 2/1992 | Dyson |
| 5,145,499 A | 9/1992 | Dyson |
| 5,160,356 A | 11/1992 | Dyson |
| D343,707 S | 1/1994 | Dyson |
| 5,558,697 A | 9/1996 | Dyson |
| 5,815,881 A | * 10/1998 | Sjogreen ...................... 15/320 |
| 5,846,273 A | 12/1998 | Dyson |
| 5,853,440 A | 12/1998 | Dyson |
| 5,858,038 A | 1/1999 | Dyson |
| 5,893,936 A | 4/1999 | Dyson |
| 5,893,938 A | 4/1999 | Dyson |
| D413,698 S | 9/1999 | Dyson |
| 6,269,518 B1 | * 8/2001 | Yung ............................ 15/352 |
| 6,406,505 B1 | * 6/2002 | Oh et al. ..................... 15/353 |

* cited by examiner

Primary Examiner—Robert A. Hopkins
(74) Attorney, Agent, or Firm—Michael I. Wolfson; Reed Smith LLP

(57) ABSTRACT

A vacuum cleaner includes a container having an inlet for dirty air, an outlet for clean air, a coarse dust chamber and a fine dust chamber. The coarse dust chamber includes a filtering tube disposed within a rotary cylinder. The fine dust chamber includes a rotary cone. Air containing dust is drawn into the coarse dust chamber and supplied into the gap between the cylinder's inner surface and the filtering tube's outer surface. The air is rotated within the coarse dust chamber to force coarse dust to travel away from the chamber's center and air containing only fine dust travels through the filtering tube. This air is supplied into the rotary cone within the fine dust chamber and is rotated to force fine dust away from the chamber's center. Dust free air, which is travelling in the center of the rotary cone, is supplied out of the filter as clean air.

34 Claims, 4 Drawing Sheets

CYCLONE AND DUST FILTER VACUUM CLEANER

BACKGROUND OF THE INVENTION

The invention relates to a vacuum cleaner and, more particularly, to a vacuum cleaner including a coarse dirt separating chamber with dust filter and a fine dirt separating chamber including a cyclone.

Traditional vacuum cleaners utilize filters or so-called dust bags to filter dirt and other particles from air drawn by a motor. After utilizing the vacuum cleaner, the dust remains in the vacuum cleaner's dust cylinder or dust bag. After multiple uses of the vacuum cleaner, the filter or dust bag must be cleaned or replaced. If the filter or dust bag is not cleaned or replaced, fine dust prevents the passage of air being drawn through the vacuum cleaner thus increasing the motor's resistance and eventually causing the motor to burn out. Moreover, prior to cleaning or replacing the dust cylinder or dust bag, the vacuum cleaner's ability to clean is continuously reduced as it is being used. Therefore, traditional vacuum cleaner designs have many disadvantages, including inconvenience to the user and degraded performance of the vacuum cleaner's ability to clean.

Recently, cyclone type dust filters for use in vacuum cleaners have been proposed. For example, U.S. Pat. Nos. 5,893,938; 5,858,038; Des. 343,707; Des. 305,269; 4,373,228 and Des. 413,698 disclose vacuum cleaners with at least one cyclonic filter. In particular, U.S. Pat. No. 5,893,938 shows the use of a dust retaining wall at the base of a frustoconical cyclone type dust filter, and U.S. Pat. No. 5,858,038 sets forth preferred distances between the base of the dust box and the bottom of the frustoconical cone of less than 8 mm or between 30 mm and 70 mm. Other patents showing multiple cyclones for use in vacuum cleaners include U.S. Pat. Nos. 5,558,697; 5,160,356; 5,145,499; 5,090,976; 4,853,011; 4,853,008; 4,826,515; and 4,593,429. Moreover, U.S. Pat. Nos. 5,893,936; 5,853,440; 5,846,273; 5,078,761; and 4,643,748 show the use of a shroud within a cyclonic dust separation device to improve filtering capability, and U.S. Pat. No. 5,062,870 shows a shut off device for use in a cyclonic vacuum cleaner.

While many of these designs and constructions are satisfactory, it is desirable to provide continued improvements and alternative designs over existing and previously proposed designs to simplify assembly and improve filtering and dirt removal.

SUMMARY OF THE INVENTION

Generally speaking, in accordance with the invention, a vacuum cleaner including a coarse dust separating filter and fine dust separating cyclone is provided. The vacuum includes a container having an inlet for dirty air, an outlet for clean air, a coarse dust removing chamber and a fine dust removing chamber. A rotary cylinder is disposed in an upper part of the coarse dust chamber, a filtering tube is disposed within the rotary cylinder, and a rotary cone is disposed within the fine dust chamber. The container's inlet is above the coarse dust chamber and the container's outlet is above the rotary cone that is disposed within the fine dust chamber. The inlet also is disposed between the rotary cylinder and the filtering tube. A guide duct is provided that extends from an upper part of the filtering tube to an upper part of the rotary cone, and the guide duct is partially disposed within the rotary cone.

The container further includes a cover, a dust box and a barricade disposed between the cover and the dust box. The inlet, outlet and guide duct are in the cover, and the rotary cylinder and rotary cone are below the barricade. A sealing plate is located below the inlet and the guide duct, and the filtering tube is installed below the sealing plate.

A spiral guide blade is disposed around an upper part of the filtering tube and is adapted to cause air within the rotary cylinder to rotate. The filtering tube length (or depth) is the same as the length (or depth) of the rotary cylinder, and the filtering tube has a sealed bottom. The bottom of the filtering tube includes a bellmouthing to prevent dust from rising into the rotary cylinder from a lower portion of the coarse dust chamber.

The rotary cone has a partially open bottom that includes a cylindrical boss connected to the rotary cone by guide ribs at the cone opening. The cylindrical boss prevents dust from rising and entering into the rotary cone.

The filter includes a discharge air tube that extends from the outlet into the rotary cone, and the discharge air tube is coaxial with the rotary cone. The filter also includes an air volume protector that is adjacent to the guide duct to enable normal operation of the filter during various conditions.

A method of filtering dust in accordance with the invention is carried out by drawing air that contains fine and coarse dust into a first dust chamber having a cylinder and a filtering tube disposed within the cylinder. The drawn air and dust are supplied into the gap between the inner surface of the cylinder and the outer surface of the filtering tube. The air and dust are rotated in the first dust chamber so as to cause the coarse dust to travel outwardly away from the filtering tube and to cause the air and fine dust to travel inwardly towards and into the filtering tube. The air and fine dust within the filtering tube are supplied to a funnel-shaped cone disposed within a second dust chamber. The air and fine dust are rotated within the funnel-shaped cone to cause the fine dust to travel outwardly towards the inner surface of the cone and to cause air without dust to travel to the center of the cone. The air travelling at the center of the funnel-shaped cone then is supplied outside the second dust chamber as filtered air.

The coarse dust travelling away from the filtering tube falls below an open bottom of the cylinder and into a bottom portion of first dust chamber, which is irregularly shaped, which causes the rate of rotation of the coarse dust to decrease, and then collect on the bottom of the first dust chamber. The air and fine dust within the filtering tube are supplied into the funnel-shaped cone at a direction that is tangential to a curved portion of the funnel-shaped cone to facilitate rotation of the air and fine dust within the filtering tube.

Fine dust travelling outwardly towards the inner surface of the funnel-shaped cone falls through a gap adjacent to a cylindrical boss disposed at the bottom of the funnel-shaped cone and then into a bottom portion of the second dust chamber, and the falling fine dust is collected on the bottom of the second dust chamber.

Air travelling at the center of the funnel-shaped cone strikes the cylindrical boss on the bottom of the cone and is forced upwards through the center of the funnel-shaped cone towards the cone's top, and the air at the top center of the funnel-shaped cone is supplied outside the second dust chamber as the filtered air.

In accordance with another embodiment of the invention, the cyclone dust filter for use with a vacuum cleaner includes a funnel-shaped cone with an opening at its smaller end and an inlet at the other end for receiving air tangentially along the inside of the cone. A cylindrical boss is disposed at the center of the cone's opening and is held in place by at least one guide rib. The cylindrical boss is sized relative to the opening so that a gap exists around the cylindrical boss to allow dust travelling along the inner surface of the cone to travel past the cylindrical boss. Each guide rib is angled along a direction of air flow so as to not restrict the passage of dust through the gap.

The method of filtering dust is carried out by supplying air having dust tangentially along the inside of a funnel-shaped cone, rotating the air and dust within the cone to cause the dust to travel outwardly towards the inner surface of the cone and to cause air substantially without dust to travel along the center axis of the cone, deflecting the air travelling along the center axis by a deflecting structure which is disposed at the center of one end of the cone, supplying the deflected air outside the cone as filtered air, and allowing dust travelling along the inner surface of the cone to pass through a gap that is disposed between the deflecting structure and the surface of the cone. Substantially all of the dust travelling through the gap is collected and prevented from being supplied with any of the filtered air.

It is therefore an object of the invention to provide a separated cyclone dust filter for a vacuum cleaner that provides greater filtering ability over existing filtering designs.

It is a further object of the invention to provide a separated cyclone dust filter for a vacuum cleaner that does not increase air resistance through the filter as the filter accumulates dust and other dirt particles from air that is being drawn by the vacuum cleaner's motor.

It is an additional object of the invention to provide a separated cyclone dust filter for a vacuum cleaner that incorporates the advantages of differently designed cyclone filters to provide extremely high separation efficiency as compared to existing designs.

Various other objects, advantages and features of the present invention will become readily apparent to those of ordinary skill in the art, and the novel features will be particularly pointed out in the appended claims.

Still other objects and advantages of the invention will in part be obvious and will in part be apparent from the specification.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DESCRIPTION OF THE PREFERRED EMBODIMENTS

Figure 1:
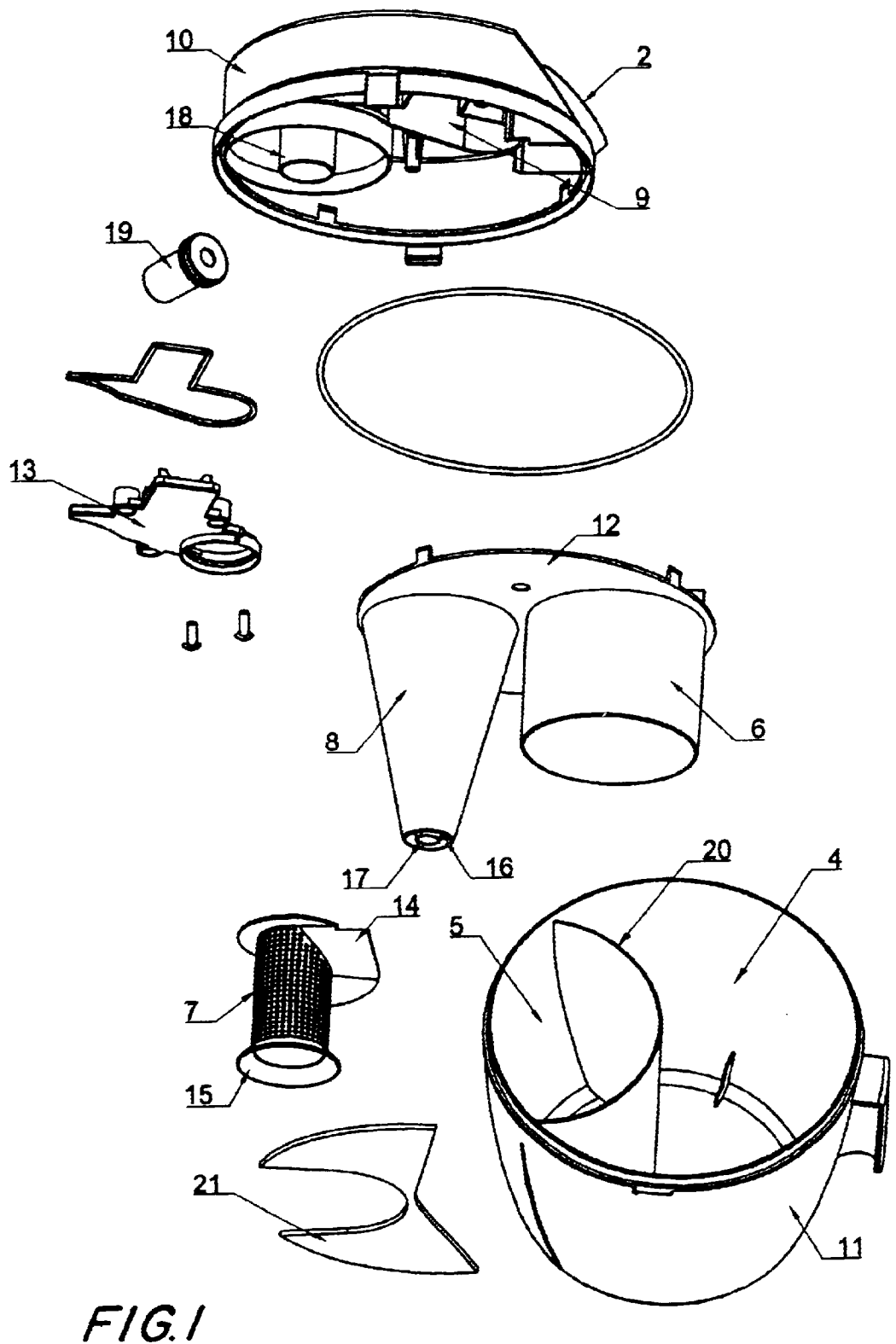
FIG. 1 schematically illustrates the various components of the vacuum cleaner constructed and arranged in accordance with the invention.

Referring first to FIG. 1 of the drawings, the various components of a vacuum cleaner 100 with dust filter and cyclone constructed and arranged in accordance with the invention is shown in an exploded view. Vacuum cleaner 100 includes a housing or container 1, an inlet for dirty air 2, an outlet for clean air 3, a coarse dust chamber 4, a fine dust chamber 5, a rotary cylinder 6, a filtering tube 7, a rotary cone 8, a guide duct 9, a cover 10, a dust box 11, a barricade 12, a sealing plate 13, a spiral guide blade 14, a bellmouthing 15, guide ribs 16, a cylindrical boss 17, a discharge air tube 18, an air volume protector 19, an arc spacer 20, and a sealing sponge 21.

Figure 2:
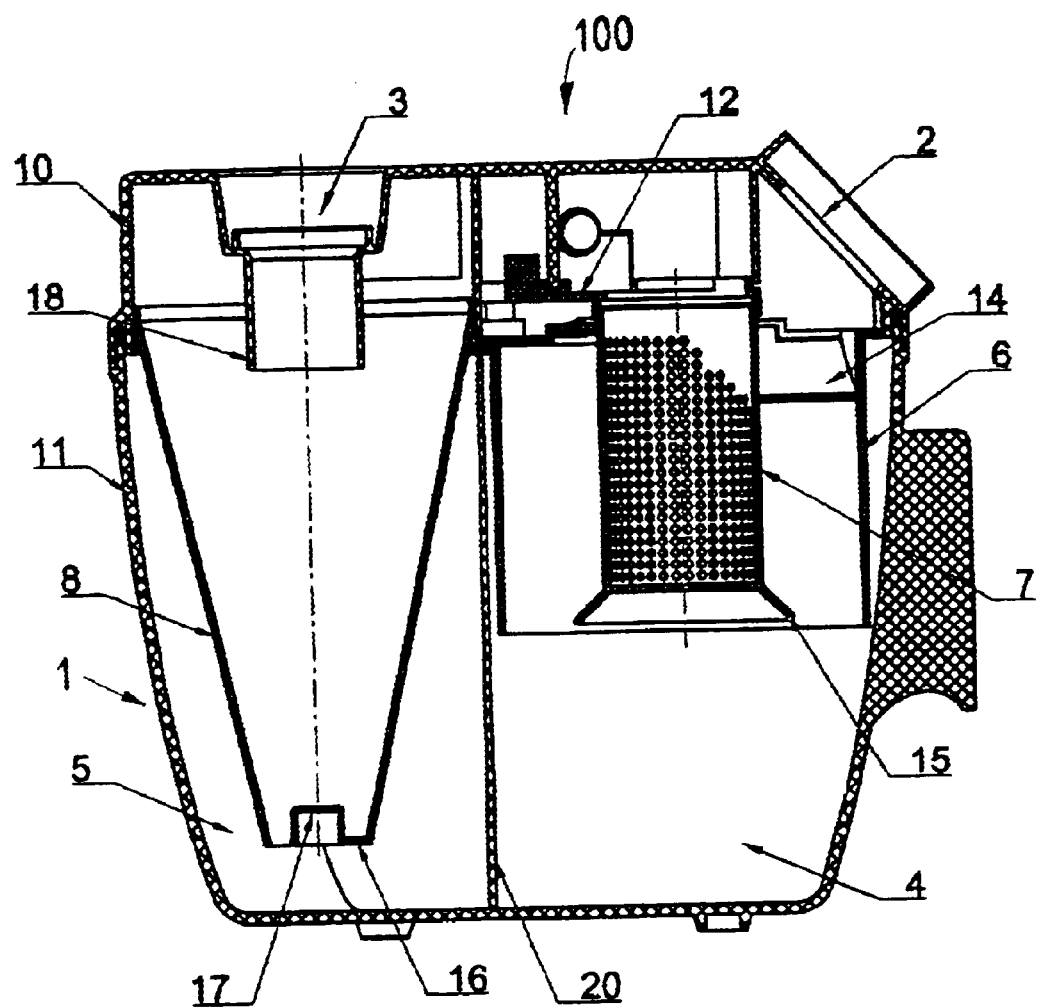
FIG. 2 schematically illustrates a side view of the fully assembled vacuum cleaner of FIG. 1.

FIG. 2 illustrates vacuum cleaner 100 fully assembled. As shown, cover 10 is disposed on container 1 so that the assembled filter includes inlet 2 through which dirty air passes and outlet 3 through which clean air passes. Container 1 includes two chambers, coarse dust chamber 4 and fine dust removal removal chamber 5. Rotary cylinder 6 is disposed in the upper part of coarse dust removal chamber 4, and coaxial filtering tube 7 is disposed within rotary cylinder 6. Inlet 2 is disposed above coarse dust removal chamber 4 and between rotary cylinder 6 and filtering tube 7.

Figure 4:
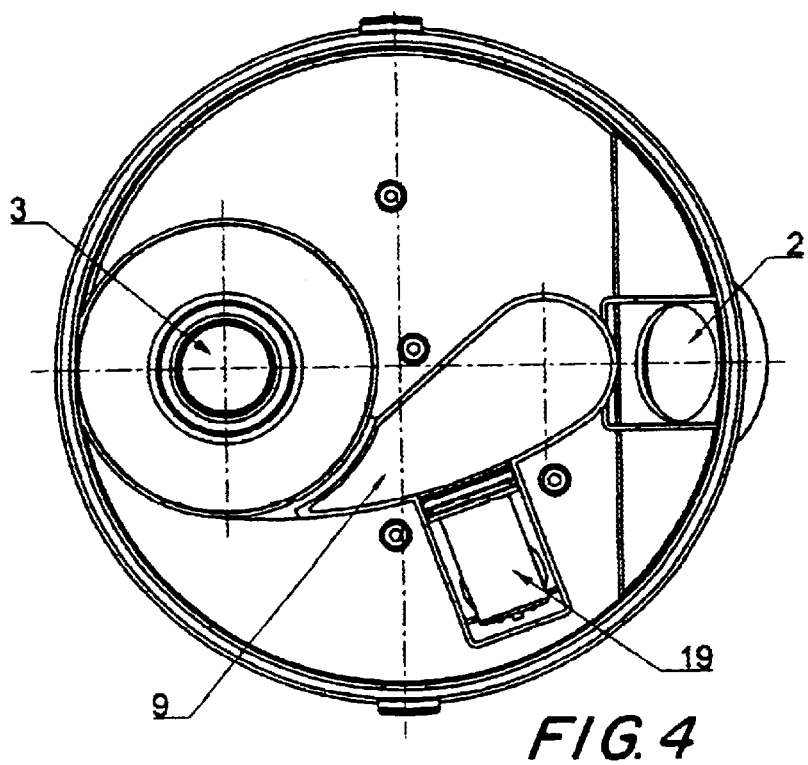
FIG. 4 is a schematic bottom view of the cover of the vacuum cleaner of FIGS. 1–3.

Rotary cone 8, which is funnel-shaped, is disposed in fine dust removal chamber 5. Rotary cone 8 includes an opening at its bottom which is disposed above the floor of container 1. Outlet 3 (for clean air) is disposed above rotary cone 8. With reference to FIGS. 1, 2 and 4, one part of guide duct 9 is disposed above filtering tube 7, and the opposite end of the guide duct is connected to the upper part of rotary cone 8. Guide duct 9 enters into the rotary cone 8 along the tangential direction relative to the curved (circular) side wall of rotary cone 8.

When assembled, barricade 12 is disposed between dust box 11 and cover 10. Inlet 2, outlet 3 and guide duct 9 are disposed in cover 10. Rotary cylinder 6 and rotary cone 8 are disposed under barricade 12. A sealing plate 13, shown in FIG. 1, is disposed under inlet 2 and guide duct 9. Filtering tube 7 is installed under sealing plate 13. Spiral guide blade 14, shown in both FIGS. 1 and 2, is disposed around the upper portion of filtering tube 7 and operates to cause dirty air to become whirlwind. Also as shown in FIG. 2, the depth (or length) of filtering tube 7 is substantially the same as the depth (length) of rotary cylinder 6. A bellmouthing 15 is disposed around the sealed bottom of filtering tube 7, which prevents coarse dust that has fallen below the bellmouthing from rising.

The bottom opening of rotary cone 8 includes guide ribs 16 coupled to a cylindrical boss 17, as shown in FIGS. 1 and 2. Cylindrical boss 17, disposed at the center of the bottom opening of the rotary cone, prevents fine dust that has left the inner volume of the rotary cone from re-entering, and guide ribs 16 may be angled along the direction of air flow so that air flow is not restricted, as further discussed below. Outlet 3 includes a discharge air tube 18, which is coaxial with rotary cone 8. As shown in FIG. 4, an air volume protector 19 is disposed adjacent to guide duct 9.

Figure 3:
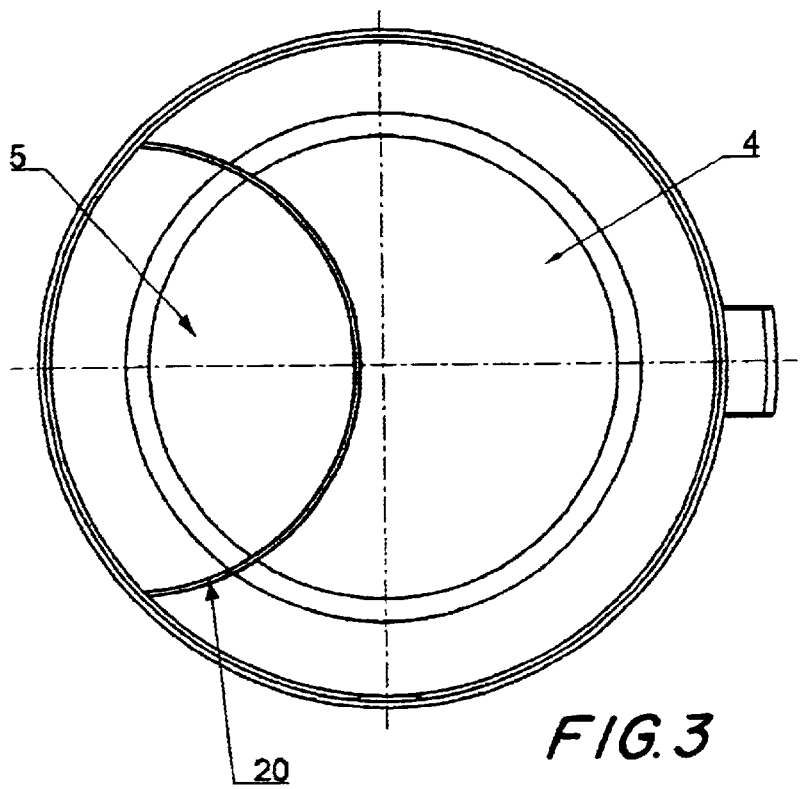
FIG. 3 schematically illustrates a top view of the dust box of the vacuum cleaner of FIGS. 1 and 2.

FIG. 3 shows dust box 11 divided by an arc spacer 20 to provide two chambers, coarse dust chamber 4 and fine dust chamber 5. Sealing sponge 21 is disposed between arc spacer 20 and barricade 12.

The filter of the vacuum cleaner in accordance with the invention includes two independent cyclone filters. The first filtering stage utilizes the coarse dust filter, which includes inlet 2, filtering tube 7, rotary cylinder 6 and coarse dust removal chamber 4. The second filtering stage utilizes the fine dust filter, which includes guide duct 9, rotary cone 8, outlet 3 and fine dust removal chamber 5.

Figure 5:
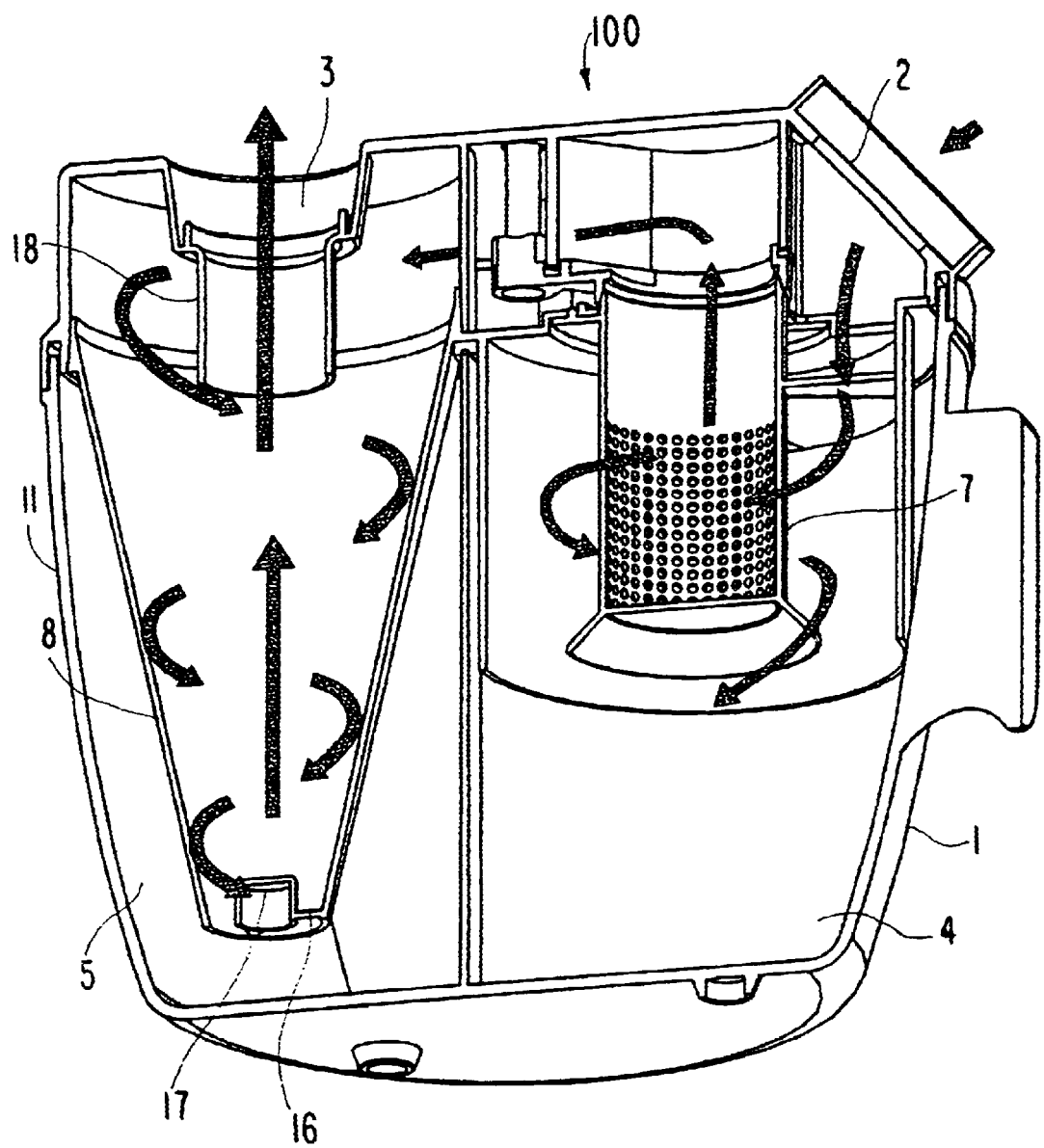
FIG. 5 is a schematic view of the air flow through the vacuum cleaner in accordance with the invention.

The filtering process in accordance with the present invention is described as follows, with reference to FIG. 5, which schematically illustrates the flow of air through the filter of the present invention. Dirty air containing dust is drawn into coarse dust removal chamber 4 via inlet 2, and then is supplied to spiral guide blade 14. Spiral guide blade directs the air to travel around filtering tube 7 in a circular direction thereby causing the drawn air to rotate along the inner wall of rotary cylinder 6. Due to the resulting centrifugal force, dust collects on the inner wall of rotary cylinder 6 while mostly dust-free air is drawn into the center of filtering tube 7. Rotary cylinder 6 is not in contact with the bottom of dust box 11, as previously discussed, and thus most of the collected dust sinks to the bottom of coarse dust removal chamber 4 due to gravity and the occurring centrifugal force. The dust falls below rotary cylinder 6 and thus is no longer supported by the rotary cylinder. Rotary cylinder 6 and dust box 11 are not on the same axis and a portion of coarse dust chamber 4 is irregular, as shown in FIG. 3. Thus, the fallen coarse dust is not able to continue to rapidly rotate, causing it to further sink to the bottom of dust box 11. Moreover, bellmouthing 15 located at the bottom of filtering tube 7 blocks any rising dust from reentering the chamber, thereby further substantially improving the filtering. Air and residual fine dust pass through filtering tube 7 and then exits the first filtering stage of the present invention.

Filtering tube 7 includes a substantial number of small holes and is designed in a manner well known in the art. In accordance with the present invention, air containing only fine dust passes through these holes and then leaves coarse dust removal chamber 4 via guide duct 9. From guide duct 9, the passing air is fed into fine dust chamber 5 along the internal surface of rotary cone 8 in the tangential direction, as previously discussed. Air and any remaining dust rotates within rotary cone 8 at a relatively high rotational speed, forming a tornado-like vortex, which causes the fine dust to move outwards towards the inner surface of rotary cone 8, thereby separating from the air. The fine dust then falls downward along the rotary cone's inner surface and passes below the bottom of the rotary cone 8, passing through the circular gap that is disposed between the side wall of cylindrical boss 17 and the inner surface of rotary cone 8. Guide ribs 16, which hold cylindrical boss 17 at the center of the bottom opening of the rotary cone, generally are sufficiently thin so as to not prevent the passage of dust through the opening and preferably are angled in the same direction as the air flow along the inner surface of rotary cone 8. One or more guide ribs may be provided to support cylindrical boss 17. Generally, three or four guide ribs disposed around the cylindrical boss is preferred. Also, although not preferred, a flat disk or other appropriate deflecting surface may be used in place of the cylindrical boss.

Fine dust leaving rotary cone 8 continues to fall until it reaches the bottom of fine dust removal chamber 5. Meanwhile, clean air, without any dust, travels downward at and near the center (i.e. center axis) of rotary cone 8. The cleanest air travelling within the center of rotary cone 8 strikes the top surface of cylindrical boss 17 and is forced upward through the central part of the rotary cone, until it exits the rotary cone through discharge air tube 18. The clean air then exits the separated cyclone dust filter of the present invention via outlet 3.

As shown in FIG. 4, an air volume protector 19 is installed within the filter of the present invention, adjacent to guide duct 9. Air volume protector 19 is open to the ambient atmosphere to facilitate proper operation of the filter. When a vacuum cleaner that includes the cyclone dust filter of the present invention is normally operating, air volume protector 19 is inactive. However, if a substantial number holes of filtering tube 7 are blocked or the air duct disposed between rotary cylinder 6 and the rotary cone is not operating properly or is blocked, protector 19 is designed to open to allow outside air to enter into guide duct 9 thus causing proper operation of the motor.

In accordance with a preferred embodiment of the invention, vacuum cleaner 100 and its various components have the characteristics described below.

1. The Diameter and Number of Holes in Filtering Tube 7:

The diameter of the holes and the number of those holes within filtering tube 7 directly affect the filtration process occurring within coarse dust chamber 4. It is preferred that each hole has a diameter between about 1.5 mm and 2.0 mm, thus preventing larger particles of dust from entering the fine dust chamber. Also, additional holes result in a larger surface area and thus the pressure at each hole is reduced, so that lighter dust and dirt do not block the holes. It is preferred that the diameter of filtering tube 7 be about 40 mm, with a filter tube height of about 64 mm and include about 21 rows of holes. Preferably, 36 holes at most are provided in each row, for a total of about 600 holes. If the total area of the holes is about 1,884 square millimeters, which is bigger than the area of inlet 2 (which may be, for example, about 961.6 square millimeters), the holes effectively prevent larger particles of dust from entering into fine dust chamber 5.

2. The Wall Thickness of Filtering Tube 7:

It is preferred that filtering tube 7 has a wall thickness of substantially between about 1.5 mm and 2.0 mm. For the exemplary design mentioned above, it is preferred that the wall thickness be about 1.5 mm since the diameter is relatively small and thus the force that it is subjected to is relatively small.

3. The Distance from the Bottom of Rotary Cone 8 to the Bottom of Dust Box 11:

The distance from the bottom of rotary cone 8 to the bottom of dust box 11 should be set accordingly. If it is too small, rotating dirty air is drawn away from discharge air tube 11 in cover 10, which reduces filtering capability. If the distance is too large, the taper of the rotary cone is affected, which also reduces filtering capability. Preferably, the distance is between about 8 and 30 mm.

4. The Taper of the Rotary Cone and its Top and Bottom Diameters:

The taper of rotary cone 8 affects filtering of fine dust. Preferably, the taper is substantially between about 10 and 20 degrees, which defines the angle of the internal surface of the rotary cone relative to the vertical axis. If the taper is either too small or too large, then rotating speed of flow is negatively affected thus reducing filtering capability.

The diameter of the top of the rotary cone should not be made too small, else the space for air rotation likewise is too small, which would cause rotating air to be drawn out through discharge air tube 18 prior to proper cleaning thereof (i.e., prior to proper filtering of fine dust), which in turn adversely affects the filtering capability. It is preferred that the top diameter of the rotary cone be at least about 60 mm. It is preferred that the bottom of the rotary cone have a diameter that is between about 15 mm and 36 mm, thus providing an appropriately angled taper.

5. The Diameter of Inlet 2.

The diameter of inlet 2, through which dirty air is drawn, preferably is about 35 mm, with a cross section area of about 961.6 square millimeters.

6. The Distance Between the Inner Wall of Rotary Cylinder 6 and Filtering Tube 7.

The distance between the inner wall of rotary cylinder 6 and filtering tube 7 preferably is about 23–27 mm. It is acceptable, however, that the distance be substantially between 12 mm and 28 mm, which provides a rotating space for dirty air that enables effective filtering. It the distance is substantially smaller, dirty air will not freely rotate and coarse dust will block the filtering tube's holes, thus reducing filtering capability.

7. The Dimension of Cylindrical Boss 17 and Guide Ribs 16.

If the dimensions of cylindrical boss 17 and guide ribs 16 are too large, the flow channel is too small allowing fine dust to be drawn back into rotary cone 8. Preferably, the distance between the edges of cylindrical boss 17 and the bottom of rotary cone 8 is between about 3 mm and 10 mm. Preferably, the height of cylindrical boss 17 is between about 10 mm and 20 mm. As previously described, guide ribs 16 support cylindrical boss 17. Guide ribs 16 also operate to direct fine dust to the bottom of dust box 11 and the angle of guide ribs 16 preferably is the same as the direction of the rotating airflow.

8. The ratio of the inner diameter of discharge air tube 18 and the diameter of the top portion of rotary cone 8 should be appropriately established.

Preferably, such ratio is between about 1:2 and 1:4, which maximizes filtering of the fine dust. Also, the distance between the bottom of discharge air tube 18 and the top of rotary cone 8 preferably is between about 5 mm and 25 mm, to maximize filtering.

While the present invention has been particularly shown and described in conjunction with preferred embodiments thereof, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

It will thus be seen that the objects set forth above, among those made apparent from the preceding description, are efficiently attained and, since certain changes may be made in carrying out the above method (process) and in the article set forth without departing from the spirit and scope of the invention, it is intended that all matter contained in the above description and shown in the accompanying drawing (s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A cyclone vacuum cleaner, comprising:
    a vacuum cleaner housing having an inlet for dirty air and an outlet for clean air, said housing having first and second chambers, said first chamber being a coarse dust removal chamber and said second chamber being a fine dust removal chamber;
    a rotary cylinder disposed in an upper part of the coarse dust removal chamber;
    a filtering tube disposed within said rotary cylinder, the inlet of said container being disposed above the coarse dust chamber, and at least a portion of the inlet being disposed between said rotary cylinder and said filtering tube;
    a rotary cone having a partially open bottom disposed within the fine dust removal chamber, said partially open bottom being disposed above a bottom of said container by a predetermined distance, said outlet of said housing being disposed above said rotary cone; and
    a guide duct extending from an upper part of said filtering tube to an upper part of said rotary cone, said guide duct being partially disposed within said rotary cone.

2. The vacuum cleaner of claim 1, wherein said housing includes a cover, a dust box, and a barricade disposed between the cover and the dust box; the inlet, the, outlet and the guide duct being disposed in the cover; the rotary cylinder and the rotary cone being disposed below the barricade; and further including a sealing plate disposed below the inlet and the guide duct; wherein said filtering tube is installed below the sealing plate.

3. The vacuum cleaner of claim 1, further comprising a spiral guide blade disposed around an upper part of the filtering tube and adapted to cause air disposed within the rotary cylinder to rotate.

4. The vacuum cleaner of claim 1, wherein a depth of said filtering tube is substantially the same as a depth of said rotary cylinder; and said filtering tube has a sealed bottom, said separated cyclone dust filter further comprising a bell-mouthing disposed around the sealed bottom of the filtering tube and adapted to prevent dust from rising into the rotary cylinder from a bottom portion of the coarse dust chamber.

5. The vacuum cleaner of claim 1, wherein the partially open bottom of said rotary cone is comprised of a cylindrical boss connected to the rotary cone by at least one guide rib, said cylindrical boss being adapted to prevent dust from rising and entering into the rotary cone.

6. The vacuum cleaner of claim 1, further comprising a discharge air tube extending from said outlet into said rotary cone, said discharge air tube being coaxial with said rotary cone.

7. The vacuum cleaner of claim 1, further comprising an air volume protector adjacent to said guide duct.

8. The vacuum cleaner of claim 1, wherein said housing includes a cover, a dust box, and a barricade disposed between the cover and the dust box; the dust box including the coarse dust chamber and the fine dust chamber; the dust box further including an arc spacer between and defining the coarse dust chamber and the fine dust chamber; and said housing further including a sealing sponge disposed between the arc spacer and the barricade.

9. The vacuum cleaner of claim 1, wherein the filtering tube includes a plurality of holes having diameters between about 1.5 mm and 2.0 mm.

10. The vacuum cleaner of claim 1, wherein the filtering tube has a wall thickness between about 1.5 mm and 2.0 mm.

11. The vacuum cleaner of claim 1, wherein a distance from the bottom of the rotary cone to a bottom of the fine dust chamber is between about 8 mm and 30 mm.

12. The vacuum cleaner of claim 1, wherein the rotary cone has a taper at an angle between about 10 and 20 degrees relative to a vertical axis; a top of the rotary cone has a diameter that is greater than or equal to 60 mm; and a bottom of the rotary cone has a diameter that is between about 15 mm and 36 mm.

13. The vacuum cleaner of claim 1, wherein the inlet has a diameter of about 35 mm.

14. The vacuum cleaner of claim 1, wherein a distance between the rotary cylinder and the filtering tube is between about 12 mm and 28 mm.

15. The vacuum cleaner of claim 1, wherein the partially open bottom of said rotary cone is comprised of a cylindrical boss connected to the rotary cone by a guide rib, said cylindrical boss being adapted to prevent dust from rising and entering into the rotary cone, a height of the cylindrical boss is between about 10 mm and 20 mm; and a distance between the cylindrical boss and an inner wall of the partially open bottom of the rotary cone is between about 3 mm and 10 mm.

16. The vacuum cleaner of claim 1, further comprising a discharge air tube extending from said outlet into said rotary cone, wherein a ratio between a diameter of the discharge air tube and a diameter of a top of the rotary cone is between about 1:2 and 1:4; and a distance between a bottom of the discharge air tube and a top of the rotary cone is between about 5 mm and 25 mm.

17. A method of filtering dust utilizing two dust removal chambers, comprising the steps of:
    drawing air containing fine and coarse dust into a first dust chamber having a cylinder and a filtering tube disposed within the cylinder, the drawn air containing fine and coarse dust being supplied into a gap disposed between an inner surface of the cylinder and an outer surface of the filtering tube;
    rotating the drawn air containing fine and coarse dust in the first dust chamber to cause the coarse dust to travel outwardly away from the filtering tube and to cause the drawn air and at least some of the fine dust to travel inwardly towards and into the filtering tube;
    supplying the air and fine dust within the filtering tube to a second dust chamber having a funnel-shaped cone, the air and fine dust being supplied within the funnel-shaped cone;
    rotating the air and fine dust within the funnel-shaped cone to cause the fine dust to travel outwardly towards an inner surface of the funnel-shaped cone and to cause the air to travel at a center of the funnel-shaped cone;
    supplying the air travelling at the center of the funnel-shaped cone outside the second dust chamber as filtered air.

18. A cyclone dust filter for a vacuum cleaner, comprising:
    a funnel-shaped cone having a smaller end and a larger end, the smaller end having an opening and the larger end having an inlet for receiving air tangentially along the inside of the cone;
    a cylindrical boss disposed at the center of the opening of the smaller end of the cone and held in place by at least one guide rib coupled between the wall of the cone and the cylindrical boss, the cylindrical boss sized relative to the opening so that a gap exists around the cylindrical boss to allow dust travelling along an inner surface of the cone to travel past the cylindrical boss.

19. The cyclone dust filter of claim 18, wherein the cylindrical boss extends into the cone.

20. The cyclone dust filter of claim 18, wherein the cylindrical boss is coupled to the cone by a plurality of guide ribs disposed around the cylindrical boss.

21. The cyclone dust filter of claim 18, wherein the cylindrical boss is adapted to deflect air travelling along a center axis of the cone.

22. The cyclone dust filter of claim 21, wherein the larger end of the cone includes an outlet at its center, the outlet supplying air deflected by the cylindrical boss outside the cone as filtered air.

23. The cyclone dust filter of claim 18, wherein the cylindrical boss is adapted to prevent dust from entering into the cone through the opening at the smaller end of the cone.

24. The cyclone dust filter of claim 18, wherein said at least one guide rib is angled along a direction of air flow so as to not restrict a passage of dust through the gap.

25. A method of filtering dust, comprising the steps of:
    supplying air having dust tangentially along an inside of a funnel-shaped cone;
    rotating the air and dust within the cone to cause the dust to travel outwardly towards an inner surface of the cone and to cause air substantially without dust to travel along a center axis of the cone;
    deflecting the air travelling along the center axis of the cone by a deflecting structure in the form of a cylindrical boss disposed at a center of one end of the cone;
    supplying the deflected air outside the cone as filtered air;
    allowing dust travelling along the inner surface of the cone to pass through a gap disposed between the deflecting structure and the surface of the cone; and
    preventing by the cylindrical boss re-entry of dust into the cone that previously passed out of the cone through the gap.

26. A vacuum cleaner, comprising:
    a vacuum cleaner housing having an inlet for dirty air and an outlet for clean air, said housing having first and second chambers, said first chamber being a coarse dust removal chamber and said second chamber being a fine dust removal chamber;
    a rotary cylinder disposed in an upper part of the coarse dust removal chamber;
    a filtering tube having a cylindrical sidewall disposed within said rotary cylinder, the inlet of said container being disposed above the coarse dust chamber, and at least a portion of the inlet being disposed between said rotary cylinder and said filtering tube;
    a spiral guide blade disposed around an upper part of the filtering tube and adapted to cause air disposed within the rotary cylinder to rotate; and
    a guide duct extending from an upper part of said filtering tube to an upper part of said fine dust removal chamber.

27. The vacuum cleaner of claim 26, further comprising a discharge air tube extending from said outlet into said fine dust removing chamber.

28. The vacuum cleaner of claim 26, wherein the filtering tube includes a plurality of holes having diameters between about 1.5 mm and 2.0 mm.

29. The vacuum cleaner of claim 26, wherein the filtering tube has a wall thickness between about 1.5 mm and 2.0 mm.

30. The vacuum cleaner of claim 26, wherein the inlet has a diameter of about 35 mm.

31. The vacuum cleaner of claim 26, wherein a distance between the rotary cylinder and the filtering tube is between about 12 mm and 28 mm.

32. The vacuum cleaner of claim 26, wherein the length of said filtering tube is substantially the same as the length of said rotary cylinder; and said filtering tube has a sealed bottom and holes in the cylindrical sidewall and further includes a bellmouthing disposed around the sealed bottom of the filtering tube to prevent dust from rising into the rotary cylinder from the bottom portion of the coarse dust chamber.

33. The vacuum cleaner of claim 30, wherein A vacuum cleaner, comprising:
    a vacuum cleaner housing having an inlet for dirty air and an outlet for clean air, said housing having first and second chambers, said first chamber being a coarse dust removal chamber and said second chamber being a fine dust removal chamber;
    a rotary cylinder disposed in an upper part of the coarse dust removal chamber;

a filtering tube having a cylindrical sidewall disposed within said rotary cylinder, the inlet of said container being disposed above the coarse dust chamber, and at least a portion of the inlet being disposed between said rotary cylinder and said filtering tube;

the length of said filtering tube is being substantially the same as the length of said rotary cylinder, said filtering tube has having a sealed bottom and holes in the cylindrical sidewall and further including a bellmouthing disposed around the sealed bottom of the filtering tube to prevent dust from rising into the rotary cylinder from the bottom portion of the coarse dust chamber; and a guide duct extending from an upper part of said filtering tube to an upper part of said fine dust removal chamber.

34. The vacuum cleaner of claim 33, further comprising a discharge air tube extending from said outlet into said fine dust removing chamber.

\* \* \* \* \*